No. 612,505. Patented Oct. 18, 1898.
W. H. POST.
WEIGHING SCALE.
(Application filed Aug. 31, 1897.)
(No Model.) 2 Sheets—Sheet 1.
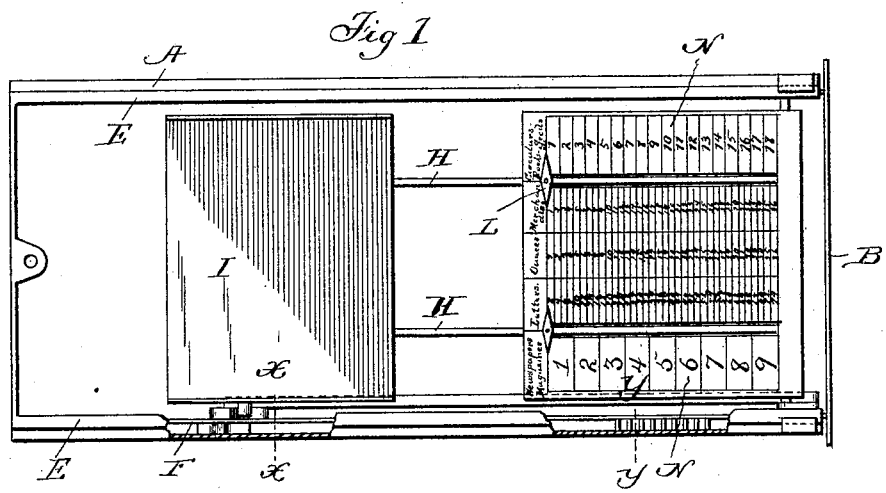
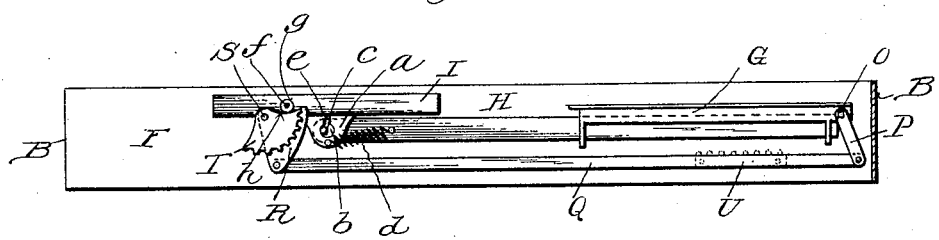
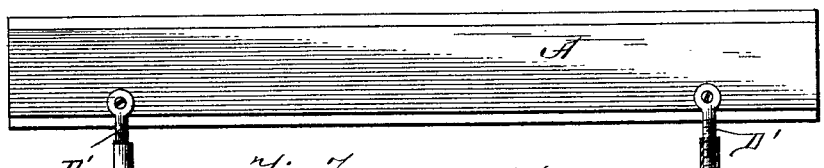
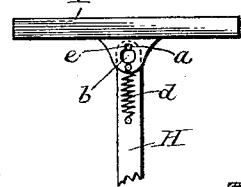
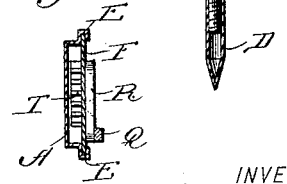
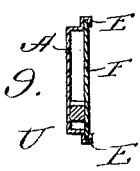
WITNESSES:
INVENTOR
Willis H. Post
BY
Hugh M. Sterling
ATTORNEY.

No. 612,505. Patented Oct. 18, 1898.
W. H. POST.
WEIGHING SCALE.
(Application filed Aug. 31, 1897.)
(No Model.) 2 Sheets—Sheet 2.
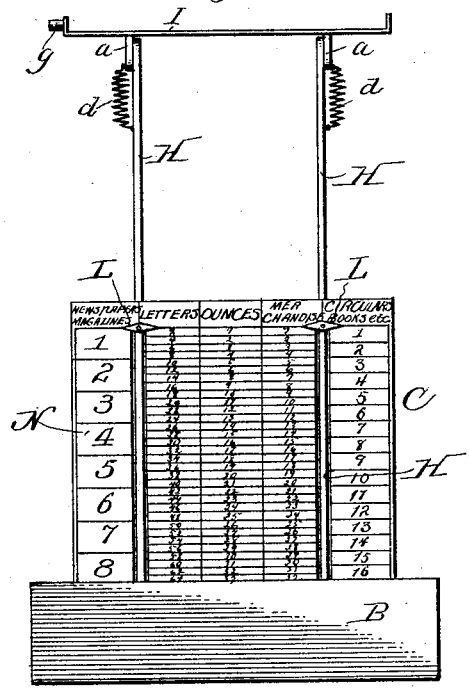
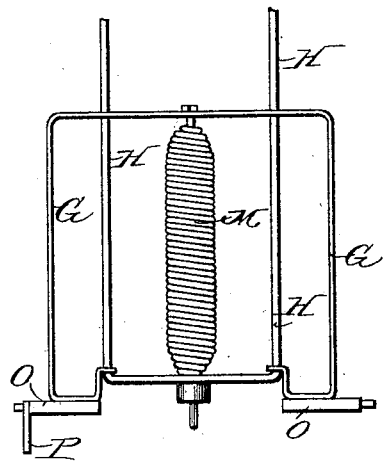
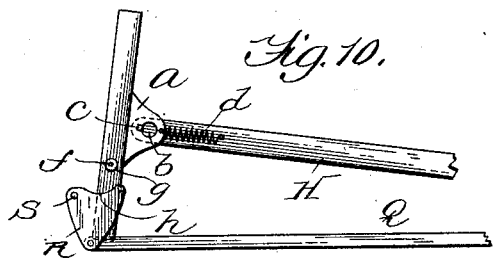
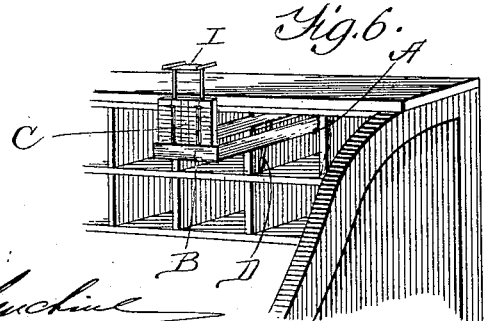

UNITED STATES PATENT OFFICE.

WILLIS H. POST, OF BLOOMINGTON, ILLINOIS.

WEIGHING-SCALE.

SPECIFICATION forming part of Letters Patent No. 612,505, dated October 18, 1898.

Application filed August 31, 1897. Serial No. 650,097. (No model.)

*To all whom it may concern:*

Be it known that I, WILLIS H. POST, a citizen of the United States, and a resident of Bloomington, in the county of McLean and State of Illinois, have invented certain new and useful Improvements in Weighing-Scales, of which the following is a full, clear, and exact description, which will enable others skilled in the art to which it appertains to make and use the same, reference being had to the accompanying drawings, and to the letters of reference marked thereon, forming a part of this specification.

The invention relates to a postal scale designed for use as an equipment of a desk, and in the pigeonhole of the desk or other suitable place the scale is to be located, so as to protect it from damage by dust and from breakage and to economize valuable space on the desk.

The main object of the invention is to provide means whereby the scale may be folded into a drawer and automatically raised to its operative or vertical position when the drawer is pulled out and assume its folded or horizontal position, likewise automatically, when the drawer is pushed in.

The invention, therefore, primarily consists in a foldable scale carried by a slide or drawer and provided with mechanism operated by the sliding movements of the slide or drawer to bring the scale to a raised or a lowered position, accordingly as said slide or drawer is pulled out or pushed in.

The invention further consists in certain other novel features in the construction and arrangement of parts, all as hereinafter set forth, and pointed out in the claims.

In the accompanying drawings, Figure 1 is a top or plan view showing the scale in its horizontal or folded position in the drawer; Fig. 2, a view in side elevation of the scale in its folded position, showing the side of the drawer or slide removed to disclose the mechanism by which the scale is operated; Fig. 3, an end or front elevation of the scale in its raised or vertical position and ready for use for weighing; Fig. 4, a view in elevation of the scale-frame, the indicator-plate having been removed therefrom to disclose the weighing-spring and the standards for supporting the weighing-pan; Fig. 5, a side elevation of a case provided with legs or braces for securing the case within one of the pigeonholes of a desk, one of the legs being shown in section; Fig. 6, a perspective view of a portion of the upper part of a desk, showing an application of the invention made to one of the pigeonholes thereof; Fig. 7, a detail view of the scale-pan and one of the supporting-standards upon which the pan is adapted to fold; Fig. 8, a sectional view of the line $x\,x$ of Fig. 1; Fig. 9, a sectional view on the line $y\,y$ of Fig. 1, and Fig. 10 a detailed view of the weighing-pan and its automatic tilting mechanism.

Referring to the drawings by letter, the inclosing part of the appliance comprises an outer case or frame A and a slide or drawer B, supported within said case and containing the scale C. The outer case A may be secured to the under side of a shelf by screws, clamps, or other suitable means, or when designed for use in a pigeonhole of a desk, as shown in Fig. 6, may be provided with legs or braces D, Fig. 5, pivoted to the sides thereof, by which to support and adjust it securely within the pigeonhole, by bringing the case to bear against the top thereof. These legs or braces assume an inclined position and are forced in at their pointed ends to securely engage the bottom of the pigeonhole. Thus inclined and wedged in the pulling force applied in drawing out the slide B acts upon the said legs or braces to increase the upward bearing of the case against the top of the pigeonhole and prevent displacement. Preferably these legs or braces are formed as shown in Fig. 5, comprising an interior-threaded extension part D and a screw-threaded core D', upon which the extension D is adjustable, by which means the legs or braces are adapted for various-sized pigeonholes and allow a more ready application of the device thereto.

The slide or drawer B is held within the case A by means of grooves or ways E, in which travel the sides F of the slide or drawer. When the case A is formed of sheet metal, it is preferably constructed as shown, the sides of the case being bent over at the top and bottom to embrace the upper and lower edges of the side frames of the slide or drawer, holding them firmly, yet permitting longitudinal movement.

The scale C, which is foldable within the drawer B, comprises a frame G, a standard-frame H, movable in frame G, carrying the weighing-pan I and pointers L, a spring M connecting the said frames and furnishing the resistance to the downward movement of the standard-frame, and a slotted indicator-plate N, provided, as is usual, with scales for computing the weight and the postage necessary for various classes of mail-matter. To the base of frame G are secured trunnions O, upon which the entire scale is supported in the drawer. The location of this support is at the front of the drawer, so that upon the full withdrawal of the drawer the scale will be free to move from a vertical to a horizontal position, and vice versa.

The raising and lowering of the scale, as before stated, is accomplished automatically in the operation of pulling out and pushing in of the drawer. To this end there is rigidly mounted on one of the trunnions O an arm or lever P, arranged at an angle of about forty-five degrees from the perpendicular, to the lower end of which is pivotally connected a bar Q, of such length as to extend nearly the length of the drawer and pivotally connect with a lever R, rigidly mounted on a shaft or pivot S, having its bearing in the side of the drawer in proximity to its rear end. Upon the outer end of the shaft or pivot S is rigidly secured a segment-rack T, which being located intermediate the drawer and the case is adapted to engage a rack U, provided on the case near its forward end and also intermediate the case and the drawer. This engagement of the segment-rack with the rack U takes place only when the drawer has been pulled out a distance sufficient to permit the scale to rise clear of the shelf above it. When the drawer has been pulled out to bring the segment-rack T into engagement with the rack U, the continued outward movement of the drawer causes the segment-rack to turn through an arc of forty-five degrees, as does the lever R. The lever P is also moved through an equal arc by having the movement of the segment-rack imparted thereto through the pivotally-connected bar Q, thus bringing the scale into a vertical position, as will be obvious. Upon the pushing in of the drawer the engagement of the segment-rack T with the rack U takes place immediately, bringing the scale into its horizontal or folded position before the drawer has advanced but slightly.

The weighing-pan I is pivotally mounted on the ends of the standards H in such a manner that it may be folded or tilted to lie parallel to the said standards. The tilting action, as well as that which restores the pan to its right-angle position, is accomplished automatically.

The pan I is provided with the lugs or ears $a$, having, respectively, the perforations $b$, in which work the pins or studs $c$, provided on the standards H at their ends. To the lower end of each of the lugs $a$ is attached one end of a coil-spring $d$, which has its other end secured to its respective standard, whereby to normally exert its force to maintain the pan in its right-angle position relative to the standards, as shown in Fig. 7.

In order that the pan may be held rigid on the standards when brought into its normal position, the pins or studs $c$ are made perfectly rectangular in cross-section and adapted to enter a rectangular notch $e$, forming a part of the perforation $b$, while the major part of said perforation is of rounded form and sufficiently large to allow the pan to turn freely on the pins or studs when said pins or studs are displaced from the notch $e$. The action of the spring $d$ in automatically tilting back the pan to its normal or weighing position also exerts its pulling force upon the lug $a$ to bring the pan downward, so as to cause the pin or stud $c$ to enter the notch $e$, thus locking said pan against turning while weighing.

To effect the automatic tilting of the pan I when the slide carrying the scale is pushed in, the pan is provided on one of its sides with a pin or projection $f$, carrying a friction-roll $g$, which as the pan descends, and as shown in Fig. 10, engages the lever R, which for the purpose of automatically tilting the pan is so modified as to have the action of a bell-crank lever in addition to its primary function, the upper part thereof being practically one arm of such lever with its fulcrum at S. The lever R is notched at $h$ to receive the friction-roll $g$ and to insure the proper engagement of said lever with the friction-roll. The friction-roll is located at such a point on the pan that its engagement with the lever R will take place before the said lever has reached the limit of its movement, whereby the further movement, which is about eight degrees, will cause the tilting of the pan to take place.

Having thus described my invention, what I claim, and desire to secure by Letters Patent, is—

1. The combination with a slide or drawer, of a weighing-scale mounted thereon to assume a vertical and a horizontal position, and means for automatically raising and lowering the scale as said slide or drawer is pulled out and pushed in, as and for the purpose set forth.

2. In an automatically-foldable scale, the combination with a slide or drawer, of a scale pivotally mounted thereon having a lever or arm for raising and lowering the scale; a segment-rack carried by the slide or drawer; means connecting said segment-rack and lever, whereby to impart the movement of the segment-rack thereto; and a stationary rack adapted to be engaged by said segment-rack in the pulling out and pushing in of the slide or drawer, as and for the purpose set forth.

3. The combination with a slide or drawer, of a weighing-scale mounted thereon to be folded back upon the same and be inclosed thereby, and means for raising and lowering the scale, automatically, as said slide or drawer is operated, said means comprising a lever carried by the scale, a lever carried by the slide or drawer, a segment-rack for imparting movement to said levers, a bar for connecting the said levers and a rack adapted to be engaged by said segment-rack, as and for the purpose set forth.

4. The combination with a slide or drawer provided with a foldable scale, of a case or frame to receive said slide or drawer, the same being provided with pivoted legs or braces, whereby said case or frame may be secured within a pigeonhole of a desk or other suitable place, as and for the purpose set forth.

In testimony of which I have hereunto set my hand this 5th day of August, 1897.

WILLIS H. POST.

In presence of—
 KATHLEEN ROBINSON,
 C. T. MCCARTY.